United States Patent [19]
Duault et al.

[11] Patent Number: 5,428,781
[45] Date of Patent: Jun. 27, 1995

[54] DISTRIBUTED MECHANISM FOR THE FAST SCHEDULING OF SHARED OBJECTS AND APPARATUS

[75] Inventors: Maurice Duault, Saint Laurent du Var; Pierre Pignal, La Gaude, both of France

[73] Assignee: International Business Machines Corp., Armonk, N.Y.

[21] Appl. No.: 170,432

[22] Filed: Dec. 16, 1993

Related U.S. Application Data

[63] Continuation of Ser. No. 563,001, Aug. 6, 1990, abandoned.

[30] Foreign Application Priority Data

Oct. 10, 1989 [EP] European Pat. Off. ............ 89480156

[51] Int. Cl.⁶ ............................................. G06F 15/167
[52] U.S. Cl. ..................... 395/650; 364/DIG. 1; 364/DIG. 2; 364/228.1; 364/229; 364/230; 364/230.2; 364/269
[58] Field of Search ............... 395/650, 200, 375, 400, 395/425, 810, 725; 364/DIG. 1 MS File, DIG. 2 MS File

[56] References Cited

U.S. PATENT DOCUMENTS

| | | | |
|---|---|---|---|
| 3,483,520 | 12/1969 | Broderick et al. | 340/172.5 |
| 3,531,777 | 9/1970 | West | 340/172.5 |
| 3,611,306 | 10/1971 | Reigel et al. | 364/200 |
| 3,614,745 | 10/1971 | Podvin et al. | 364/200 |
| 3,753,234 | 8/1973 | Gilbert et al. | 340/172.5 |
| 4,204,251 | 5/1980 | Brudevoid | 364/200 |
| 4,214,305 | 7/1980 | Tokita et al. | 364/200 |
| 4,325,120 | 4/1982 | Colley et al. | 395/375 |
| 4,333,144 | 6/1982 | Whiteside et al. | 395/650 |
| 4,359,770 | 11/1982 | Suzuka | 370/108 |
| 4,402,046 | 8/1983 | Cox et al. | 395/200 |
| 4,833,598 | 5/1989 | Imamura et al. | 364/200 |
| 4,839,798 | 6/1989 | Eguchi et al. | 364/200 |
| 4,937,737 | 6/1990 | Schwane et al. | 364/200 |
| 5,050,070 | 9/1991 | Chastain et al. | 395/375 |
| 5,159,686 | 10/1992 | Chastain et al. | 395/650 |

FOREIGN PATENT DOCUMENTS 7306423 9/1973 France ............ G06F 15/16

*Primary Examiner*—Robert B. Harrell
*Attorney, Agent, or Firm*—Joscelyn G. Cockburn

[57] ABSTRACT

In a loosely coupled multiprocessor environment wherein a plurality of processors (2) are attached to a shared intelligent memory (1), a distributed scheduling mechanism for scheduling of source processors (4) with respective server processes (5) to be executed by the processors (2) upon their attachment to a data message queue (3) contained in the shared intelligent memory (1), the processes (4, 5) using data messages enqueued into, respectively dequeued from said memory (1). According to this scheduling mechanism, an independent scheduler (6) is dedicated to each of the processes of a process group, and all the schedulers monitor the status of the data message queue, and upon receipt of an empty-to-non-empty E-NE signal, the least busy scheduler dequeues shared data from the queue, so that it can be processed by its associated process, without however, loosing fault-tolerance in case of a particular processor failing.

5 Claims, 4 Drawing Sheets

QCB : QUEUE CONTROL BLOCK
SPL : SIGNALLING PROCESSOR LIST
EP : ENQUEUE POINTER
DP : DEQUEUE POINTER
ES : ELEMENT SIZE b : Boolean ATTACH COMMAND
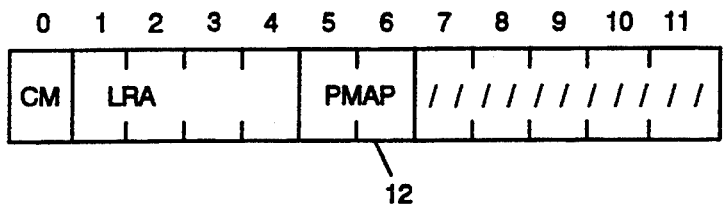
RESPONSE
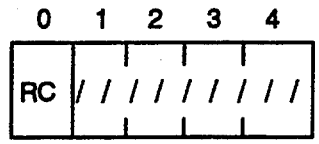
CM : MEMORY COMMAND CODE
LRA : LOGICAL RECORD ADDRESS
PMAP : PROCESSOR MAP
RC : RETURN CODE
// : UNUSED
FIG. 4
DETACH COMMAND
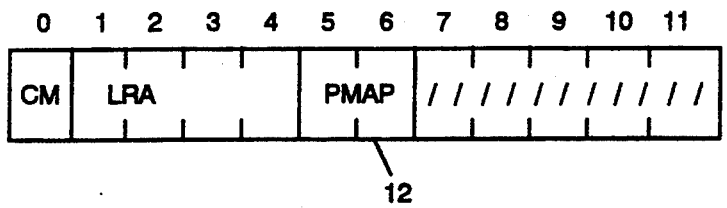
RESPONSE
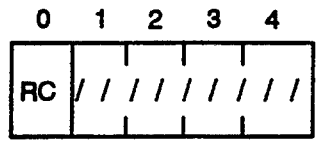
CM : MEMORY COMMAND CODE
LRA : LOGICAL RECORD ADDRESS
PMAP : PROCESSOR MAP
RC : RETURN CODE
// : UNUSED
FIG. 5
FIG. 6
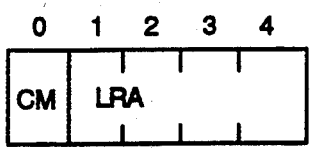
CM : MEMORY COMMAND CODE
LRA : LOGICAL RECORD ADDRESS
FIG. 7
SCHEDULER STATE TABLE
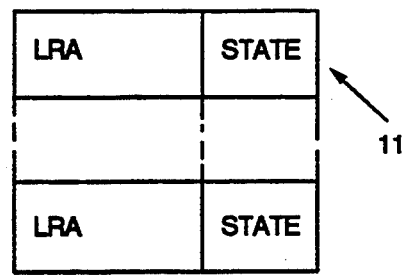
LRA : LOGICAL RECORD ADDRESS

DISTRIBUTED MECHANISM FOR THE FAST SCHEDULING OF SHARED OBJECTS AND APPARATUS

RELATED APPLICATIONS

This application is a continuation of U.S. patent application 07/563,001, filed Aug. 6, 1990, now abandoned.

FIELD OF THE INVENTION

The present invention is relative to a distributed mechanism for scheduling shared objects in a loosely coupled multiprocessor environment such as front end processors attached to a shared intelligent memory. The invention finds a typical but not limitative application in communications controllers having, as described in European Patent application No. 88480102.8, an intelligent shared memory through which users or multiprocessors communicate, with an optimized level of transparency versus the physical location of information in the memory.

BACKGROUND

The context of the invention is a system structure constructed of processes which communicate using messages. Processes are sets of elementary tasks (elementary programs that can be loaded and that can run in the system). A process may be initially created in several processors and executed in these different processors, with specific data to be processed by each processor. The messages allow the communication between the processes. As an example, a requester process sends a specific message to make a request to some server process, which provides, accordingly, information or processing.

As an example, in a communications controller including an intelligent shared memory of the type described in European patent application No. 88480102.8, the Line Interface Modules (LIMs) communicate through the shared memory, and the process performed on data in each specific LIM is an example of a process as referred to in the present application.

Traditional operating systems or control programs provide a set of functions to create queues for holding the messages until they are handled. There are two main operations performed on these queues, namely enqueing messages and dequeing messages. Different tasks may work on the same queues. The set of distributed processes which work on a same queue of data messages is known as a process group.

The scheduler is the coordinator of the different process requests. A scheduler performs the function of an arbitrator within a processor or a group of processors, depending on whether a decentralized or a centralized architecture is considered. In known centralized scheduling mechanisms, the scheduler is aware of all the requests posted by tasks within the process group. Therefore, in the case of numerous tasks which are distributed in several processors (it is the case when the software path lengths within a single processor are too high), the central scheduler constitutes a bottleneck.

Moreover, the central scheduling mechanism implies processor to processor communications to ask for messages and to receive messages. Thus, if the processor containing the central scheduler comes to fail, then all the processes belonging to the related process group will also fail.

Consequently, the known central scheduling mechanism appears not to be tolerant to component failures, even single component failures.

For an example of centralized scheduling mechanism, it can be referred to European patent No. 0 230 721, showing a single centralizd scheduler located in a Host computer.

In the contrary, in a decentralized scheduling mechanism, there are as many schedulers involved as there are processors in the process group.

However, in known decentralized scheduling mechanisms, the decentralized schedulers are dependant on both decentralized processes and decentralized data to be used by said processes. This cannot be conciliated with a shared memory environment, wherein the available memory space is shared by several loosely coupled processors.

As a matter of example, an approach of a decentralized scheduling mechanism is described in U.S. Pat. No. 4,387,427 and in European patents 0183817 and 0230721.

While U.S. Pat. No. 4,387,427 discloses a process dispatcher which involves dual-purpose queuing of both messages of a process and the processes themselves, the remaining above mentioned documents disclose time-shared source processors which choose target processors in a deterministic way.

In summary, the scheduling mechanisms as taught by the prior art are, if not centralized, decentralized but incapable of working with fully shared tasks and independant schedulers.

OBJECTS OF THE INVENTION

The object of the present invention is to provide a fast mechanism and apparatus for scheduling software tasks (elementary programs) distributed in different processors wherein each of said software tasks performs the same function. Thus, the aim of subject scheduling mechanism is to render the scheduling and execution of tasks capable of tolerating processor failures.

According to a more accurately stated object of the invention, it is its purpose to provide a scheduling mechanism which is robust with respect to the failures of any processor belonging to a given process group.

It is a further object of the invention to provide a high speed scheduling mechanism, in terms of number of signals between the shared memory and each processor, and in terms of number of dequeue operations needed by the processors in order to get the data messages out of the central shared system storage, called Packet Memory in compliance with the vocabulary used for same entity in previously mentioned European patent application No. 8480102.8, the teachings of which are incorporated herein by reference.

Additionally, it is an object of the invention to provide for the scheduling of tasks, by using several queues of data messages according to different levels of priority for processing said data messages.

SUMMARY OF THE INVENTION

These objects are achieved by the distributed scheduling mechanism as defined in claim 1.

According to the invention, in a loosely coupled multiprocessor environment wherein a plurality of processors (2) are attached to a shared intelligent memory (1), a distributed scheduling mechanism is provided for the fast scheduling of source (4) respectively server processes (5) to be executed by said processors (2) upon their attachment to a data message queue (3) contained in said shared intelligent memory (1), said processes (4,5) using data messages enqueued into, respectively dequeued from said memory (1). This scheduling mechanism is characterized in that it includes the steps of:

(a) creating within said shared memory a FIFO data message queue dedicated to all the processes of a process group;

(b) memorizing, for said FIFO data message queue, a signalling processor list SPL containing the references of the server processes which need to dequeue data messages from said queue, and updating said signalling processor list after each dequeue operation;

(c) for a given source process, enqueuing a data message into said FIFO data message queue;

(d) monitoring the status of said data message queue, and if said queue is empty, generating an empty-to-nonempty E-NE signal upon enqueuing of a new data message;

(e) transmitting said E-NE signal to all the server processors running their associated server processes, as memorized in said signalling processor list SPL(10);

(f) upon receipt of said E-NE signal by the server processes, scheduling a given server process through a scheduler dedicated thereto, whereby a data message to be used by said given server process is dequeued from said data message queue to be used by said server process;

(g) updating the FIFO data message queue state within a scheduler state table dedicated to each scheduler.

Further features and advantages of the invention will become apparent from the following detailed description of a preferred embodiment, in connection with the accompanying drawings.

BRIEF DESCRIPTION OF THE DRAWINGS

FIG. 4 shows the format of an ATTACH command as used in the scheduling mechanism of the invention.

FIG. 5 shows the format of a DETACH command as used in the scheduling mechanism of the invention.

FIG. 6 shows the format of a SIGNAL command as used in the scheduling mechanism of the invention.

FIG. 7 shows the format of a scheduler state table included in each of the decentralized shedulers represented in FIG. 2.

DETAILED DESCRIPTION OF THE INVENTION

Figure 1:
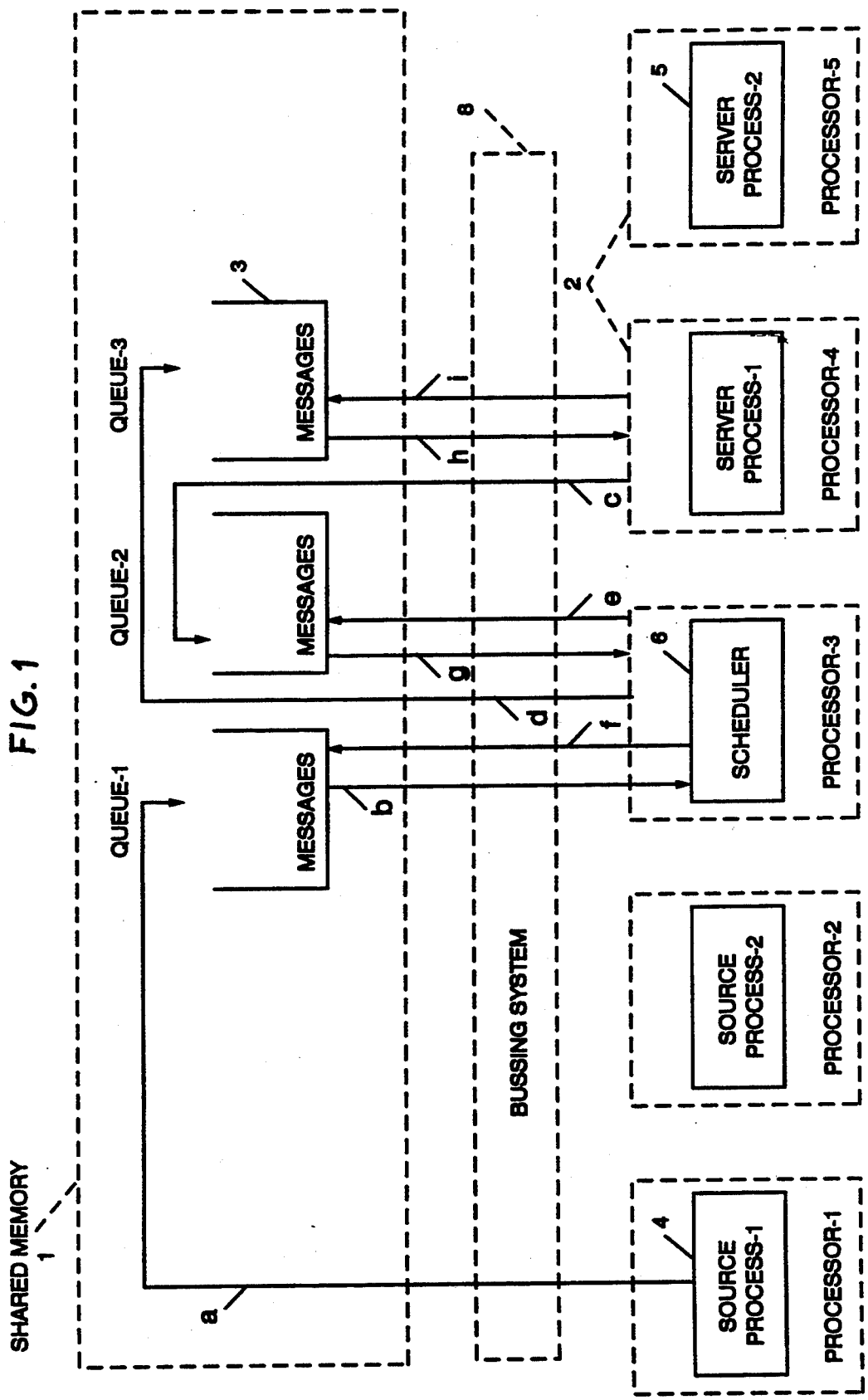
FIG. 1 is a block diagram of a set of processors communicating through a shared memory, the corresponding software tasks being scheduled according to a typical centralized scheduling mechanism pertaining to the prior art.

As above indicated, the invention will be described in relation to the general environment of a packet memory as the one specified in European patent application No. 88480102.8, which is not to limit the scope of the invention.

The main characteristics of the packet memory that are useful for the understanding and implementation of the scheduling mechanism according to the invention are summarized below.

A distributed system composed of a set of processors interconnected via a shared memory, known as packet memory is considered. All processors can accede to the packet memory queues (hardware queues).

The building of queues and the subsequent message passing between processors is made by using high level commands CREATE, ENQUEUE, DEQUEUE, PUT and GET as described in the patent application concerning the packet memory, already introduced above.

For the sake of the description of the present invention, some additional definitions as well as other properties of the packet memory are introduced.

The assumption is made that a process group, which can theorically concern from only one to a plurality of processors, herein concerns at least two processors working on a same queue, because the fault tolerant property, which is one of the advantages obtained thanks to the invention, does only make sense when the process group includes at least two processes, and one process per processor.

For more clarity, this assumption will be kept throughout the following developments, although the invention would operate in the case of several processes dedicated to each processor.

Further, the packet memory can perform a broadcast signalling to notify the different interconnected processors that the status of one of its queues has been modified. Therefore, the packet memory is able to internally generate, upon monitoring of the state of the message queues, a SIGNAL E-NE or NE-E, for respectively signalling to the processors, within a given message queue, the transition from an EMPTY state to an NON-EMPTY state, or vice-versa. Although both possibilities are technically relevant, it is most advantageous to signal only the transition "empty to non empty", for reasons described farther.

If several processes dequeue data messages from a given shared queue on a competition basis, and if the transition "not empty to empty" is broadcasted by a signal NE-E to all the processes, it would be unlikely to get rid of the situation wherein a dequeue operation is made on an empty queue. If several server processes are equally loaded, they will perform a dequeue operation at approximately the same time. The least busy process will get the message in the queue. The other processes will perform a dequeue on the empty queue before receiving and processing the signal E-NE. In addition, if a process is highly loaded, a new message may arrive in the queue before it has time to process the signal E-NE. According to the invention the processing of a dequeue on an empty queue has the same path length as the processing of a signal NE-E. It is then preferable that the packet memory does not send any signal NE-E.

In the contrary, if it is the transition "empty to not empty" which is broadcasted by a signal E-NE, all the processes working on the same queue, (i.e all the processes of the same process group will be informed that they can compete for the next message to be dequeued).

Therefore, only the implementation including an E-NE signal will be detailed, being understood that the other cited approach would involve very similar means, although less efficient.

A given processor knows that a queue in the packet memory is empty thanks to the status contained in the last message dequeued by the process.

The packet memory has one bit per process related to each processor (FIG. 3B), whereby it sends the signal E-NE.

The dequeue operations are atomic, which means that once a given processor begins to dequeue a queue in the packet memory, it is not interrupted before full execution of the dequeue command. This is easily obtained by adequate chaining of the packet memory internal microprograms corresponding to the steps of the DEQUEUE high level command.

The format of the SIGNAL command generated by the packet memory is shown in FIG. 6. It includes a command field CM whereby the packet memory notifies the different processors that the information sent is a signalling information, and a logical record address LRA field, corresponding to the identifier, within the packet memory, of the queue of messages that passes from an empty state to a non empty state.

Description of a Conventional Scheduling Mechanism When Used With the Packet Memory Structure FIG. 1 shows an example of prior art centralized scheduling mechanism, used in a structure of a packet memory (1). The processors (2) numbered 1 to 5 run processes, which are called source processes when they enqueue data messages into FIFO queues (3) of the packet memory, or server processes when they dequeue data messages from the queues of the packet memory. The connections between the processors (2) and the shared memory (1) are made through a bussing system (8) which is not described in detail since it is not involved by the invemtion.

In this configuration, there can exist multiple source processes, multiple server (or target) processes, and a unique scheduler. It is a standard configuration which is used when shared objects i.e queues containing data messages can be manipulated by different server processes running all in different processors, and a queue is dedicated to only one process in one processor. This corresponds to the simplest configuration, but is nevertheless sufficient to demonstrate the limits of central scheduling in such a structure. Thus, in the case where each process runs in a particular processor, according to FIG. 1, the source process_1 sends a data message to the queue-1 of the scheduler, and the server process_1 is ready to get a message, by dequeuing queue-2.

Since a given source process does not know the state of the queue dedicated to a given server process, nor if the server process is ready to receive the message, the source process cannot send directly the data message to a server queue. Therefore, it is the responsibility of the unique scheduler to know the state of the only process group data message queue (the queue_1), and to know which server process is ready to receive data messages.

Accordingly, the flow of messages and signals is the following:

a) The source process_1 sends the data message to the data queue_1 of the packet memory, said queue being dedicated to the central scheduler (6), b) The packet memory signals Empty-To-Non-Empty to the scheduler (6), if the queue-1 was empty, c) The server process_1 sends a control message to the queue_2 to request a data message, d) The packet memory signals Empty-To-Non-Empty to the scheduler if queue-2 was empty, e) The scheduler dequeues the request message in the queue_2, f) The scheduler dequeues the data message in the queue_1, g) The scheduler sends the data message to the queue_3 dedicated to server process-1, h) The packet memory signals Empty-To-Non-Empty to the scheduler if the queue-3 was empty, i) The server process_1 dequeues the data message in the queue_3.

As a consequence it can be observed-that six operations (a, c, e, f, g, i) are needed if no queue was empty, and nine operations (a, b, c, d, c, f, g, h, i) are needed if each queue was initially empty. Moreover, if the processor-3 dedicated to the scheduler comes to fail, the whole system is down.

The drawbacks recalled above are overcome by the decentralized scheduling mechanism according to the invention, which will now be detailed.

Example With a Decentralized Scheduler

Figure 2:
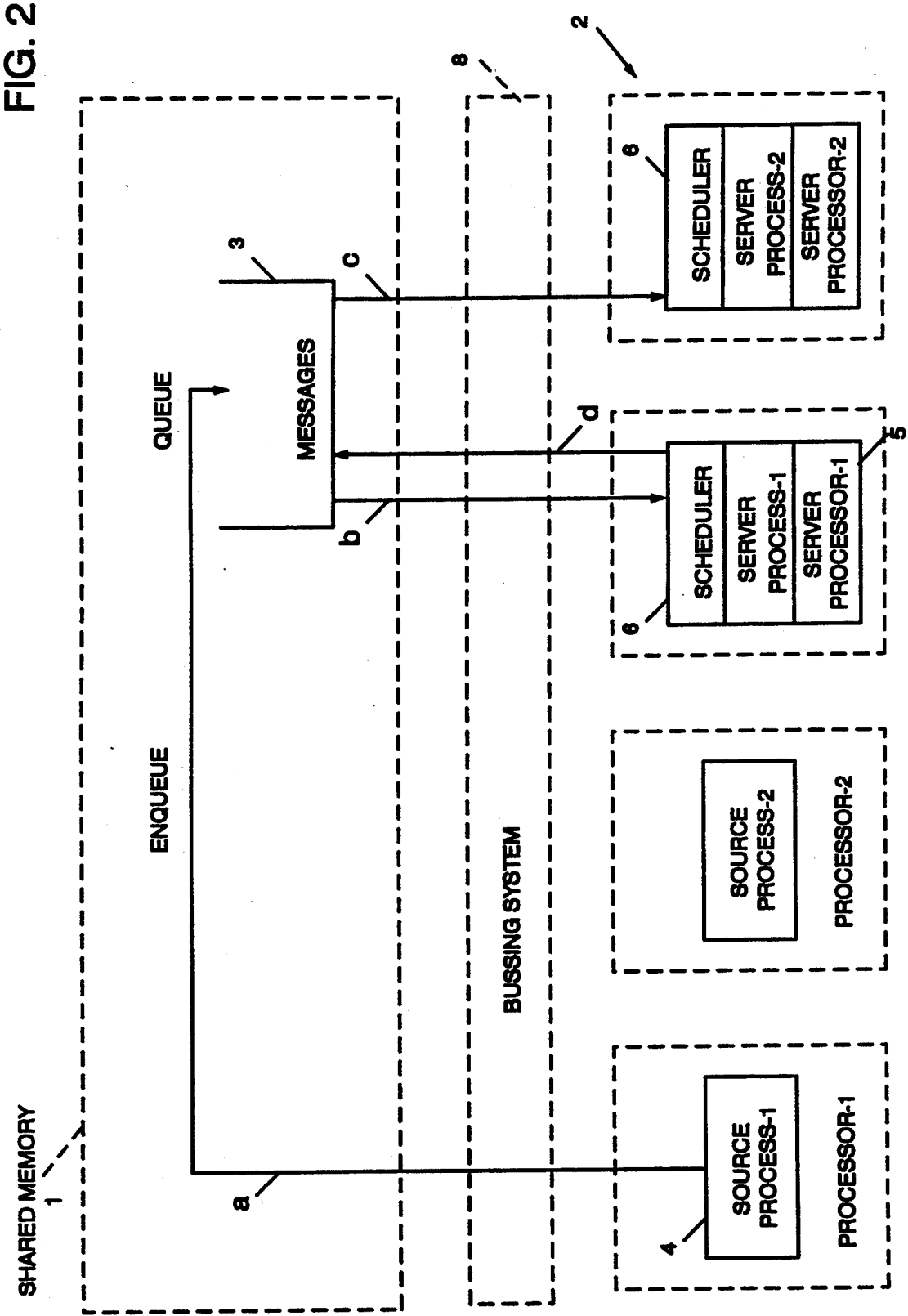
FIG. 2 is a block diagram showing the communication process between processors using the packet memory according to the scheduling mechanism of the present invention.

The scheduling mechanism according to the invention is explained in reference to FIG. 2.

In this configuration, there can be multiple source processes (4), multiple server processes (5), and multiple schedulers (6) associated to each server process, in the ratio of one scheduler per server process. It uses the queue (3), which means that several server processes, in fact all the server processes of a process group as defined above, can receive signalling information simultaneously and can dequeue data messages from the only one queue (3). The signalling information sent by the packet memory to the server process is the Empty-to-non-Empty signal E-NE. In the simplest case where, as represented in FIG. 2, each process to be scheduled is run in a different processor, the source process-1 sends a data message to the queue (3), which is the unique queue of the process group. The server processes-1 and 2 are ready to dequeue this message.

This example can be easily generalised to any number of source and server processes.

The flow of messages and signals is the following:

a) The source process_1 sends the data message to the queue, where it is enqueued.

b) If the queue was empty, the packet memory signals Empty-To-Non-Empty to the server process_1 c) Similarly, the queue signals Empty-To-Non-Empty if the queue was empty, to the server process_2, since the latter pertains to the same process group as server process-1.

d) The scheduler (6) of the server process_1 dequeues the data message from the queue (3)

From the steps above, it can already be observed that the distributed scheduling mechanism involves one independant scheduler per server process, which confers fault tolerance to it, in case of a problem with one of the schedulers, since the data message can always be dequeued by another scheduler and used in the server process associated to it. Thus, in the case where the server processes are the communication processes running in the Line Interface Modules (LIMs) of a communications controller using a multi-link transmission group, the overall transmission would not suffer in case of a failure occuring in the scheduler of a given LIM process.

A more detailed description of the steps involved by the new scheduling mechanism is given below, supported by the hardware provided by the intelligent packet memory described in patent application EP-88480102.8.

Figure 3A:
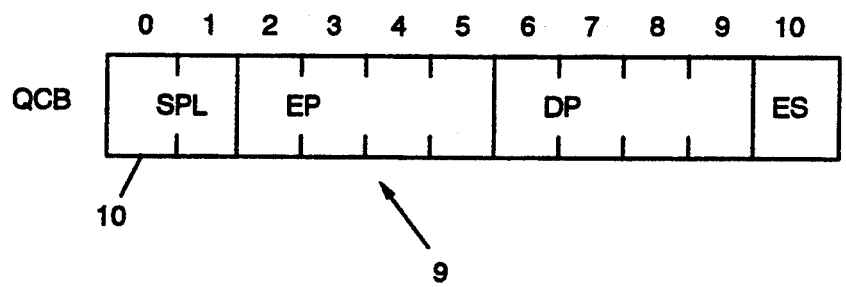
FIG. 3A shows the format of a queue control block (QCB) used for managing the information queued in the packet memory.
Figure 3B:
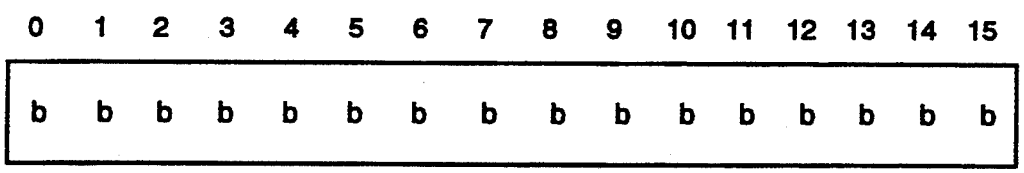
FIG. 3B shows a detailed view of one of the fields of the QCB represented in FIG. 3A.

1. The packet memory memorizes for each queue the list of the processor numbers which need to receive signals (i.e the processors pertaining to the process group) when the queue passes from the state 'Empty' to the state 'Non-Empty'. This list of the processors is called the Signalling Processor List (SPL). This list is located in the Queue Control Block attached to a queue as represented in FIG. 3A. It is modified only when a processor is added to or removed from the process group.

The remaining fields of the QCB (EP,DP,ES) have been extensively described in the above cited patent application. The SPL field (10) is represented in greater detail in FIG. 3B. The Signalling Processor List in the QCB has 16 bits. One bit is defined for each possible processor in the system. When bit n is ON, the processor n has been attached to the queue, and will receive a signal E-NE once the queue passes from state Empty to state Non Empty. In the case of 16 processors, the list has a size of 16 bits. Each bit refers to one and only one processor of the system. The signal E-NE, which mentions that the given queue goes from the state 'Empty' to the state 'Non-Empty' is sent by the packet memory to the processor whose bit is set to 1 (ON) in the Signalling Processor List.

2. Each scheduler memorizes the state of the queue and the identifier (LRA) of the queue for the queue belonging to the process group. This is achieved thanks to the Scheduler State Table. (11) (FIG. 7). There is one scheduler state table per scheduler. This table contains the list of the Logical Record Addresses of the queues (if there are several queues) and their associated scheduler queue state, namely empty or non-empty.

It is to be noted that the scheduler itself is not further described since it is known per se and is not a part of the invention.

3. At the creation by a supervisor process of a queue of data messages, the packet memory creates the identifier of the queue and initialises the list of the processor numbers associated to this queue. Each scheduler memorizes the identifier (LRA) of the queue in table (11) (FIG. 7) and initialises the state of the queue to the value 'Empty'. This is achieved as follows:
 (1) a supervisor process running in one of the processors (LIMs) creates a queue with the CREATE command; then,
 (2) this process notifies each scheduler of the process group that a queue has been created by sending the Logical Record Address (LRA) of the queue to the schedulers; then,
 (3) each scheduler performs an ATTACH command toward the data message queue (3) of the packet memory. The format of an ATTACH command is shown in FIG. 4; then,
 (4) the Packet Memory performs an OR function between the Signalling Processor List (10) of the QCB (9) and the Processor Map field PMAP (12) of the ATTACH command to update its Signalling Processor List, the QCB thus containing the list of processors which should receive the signal E-NE. Finally,
 (5) each scheduler initializes its own Scheduler State Table related to this queue by setting therein an "Empty" value.

4. At the creation of an additional scheduler and its associated process, on an existing process group, the supervisor process gives to the new scheduler the identifier (LRA) of the queue. Then the scheduler attaches itself to the queue and initialises the queue state to the value "Non Empty". This is done as follows:
 (1) The added scheduler (1) receives the Logical Record Address of the queue;
 (2) performs an ATTACH command to the queue, and
 (3) initializes the queue by setting the value corresponding to "Non-empty" in the Scheduler State Table.

This third step corresponds to the assumption that the queue is, by default, not empty, which will allow a new dequeue operation. Thus, if the queue was really empty, the distributed schedulers will be informed of that.

5. When the queue initially empty receives a data message from a source process, the packet memory sends a signal 'Empty To Non-Empty' to all the processors belonging to the process group. At the reception of the signal, each scheduler updates its corresponding queue state. This is done as follows:
 (1) the Packet Memory scans each bit in the Signalling Processor List SPL (10) to determine the processor to which a signal E-NE should be sent;
 (2) the Packet Memory sends the signal to the processors selected in the SPL (10).
 (3) at the reception of a data message by the queue, each scheduler puts the non-empty state into the entry of the Scheduler State Table (11) that is related to the queue.

6. When a scheduler dequeues a message from the queue (3), it receives from the packet memory a status specifying the new state of the queue. If the queue is empty, the scheduler updates its corresponding queue state in the Scheduler State Table. The status of the queue is contained in the Return Code (RC) of each Dequeue command.

7. Upon decision of an operator or a supervisor process to deactivate a process of a process group, the corresponding scheduler stops its activity and exits the process group. Therefore, it performs:
 (1) a DETACH command, the format of which is shown in FIG. 5. This format is similar to the format of an ATTACH command, with a different command code (CM).
 Execution of a DETACH command by the processor running a given scheduler results in detaching said processor from the data message queue in the packet memory. Then,
 (2) the Packet Memory performs an XOR command between the Signalling Processor List SPL (10) and the Processor Map PMAP (12) (in particular to get a bit '0' when both bits ill the Scheduler Processor List and in the Processor Map are equal to '1'); then,
 (3) the scheduler and its associated Server Process are deactivated.

Example: if P0 and P1 are initially the only activated processors, the SPL field of the QCB will be: 11000000 00000000

The PMAP field corresponding; to a DETACH command of P1 will be: 01000000 00000000. An XOR operation between SPL and PMAP fields will result into an updated SPL content: 10000000 00000000, meaning that P1 has disappeared, P0 being the only processor to remain attached to the data message queue.

The above described scheduling mechanism of shared processes allows a fast and fault-tolerant scheduling of processes run in processors connected to the packet memory. Some proofs of the efficiency of this scheduling mechanism will be given below.

First, the following notations have to be set:

N=Number of schedulers involved in the Process Group i=Value of one particular scheduler. i=<1...N>.

M=Number of data messages to process.

T1i=Processing time in the Packet Memory and transmission time between the Packet Memory and the processor i to perform a signal Empty-To-Non-Empty.

T2i=Processing time in the scheduler i to process the event 'signal Empty-To-Non-Empty activated' and to update the queue state.

T3i=Delay in the processor i between a state update and the beginning of a dequeue operation.

T4i=Processing time in the Packet Memory and transmission time between the Packet Memory and the processor i to perform a dequeue command.

T5i=Processing time in the scheduler i to process the event 'dequeue status empty' and update the queue state.

It will now be demonstrated that the scheduling mechanism is correct (i.e. its relate Final State Machine is deadlock free), robust with respect to the failures of any processor belonging to the process group, and fast.

Correctness

In the data message queue, the real state can either be 'Empty' or 'Non_Empty'.

The scheduler also defines two states: 'Empty' or 'Non-Empty', which are stored in the Scheduler statue Table (11) upon receipt of a signal from the packet memory.

As long as there is no failure, T1i, T2i, T3i, T4i and T5i are finite. Consequently, it can be demonstrated that the scheduler queue state gets equal to the real queue state after abounded delay.

This is true in two configurations, namely at initialisation of a queue identifier (LRA), and at any change of the real queue state after initialisation.

1. Correctness After an Initialisation

At initialisation of a queue identifier in a scheduler, the real state of the queue can either be 'Empty' if the queue has been created after the scheduler is connected, or it can be unknown if the queue has been created before the scheduler is connected.

If the real state of the queue is 'Empty', the scheduler queue state is empty and both states are equal.

If the real state of the queue is unknown, the initial state in the scheduler is set to 'Non-Empty'. The scheduler performs a dequeue at time t+T3i, and updates the state at time t+T3i+T4i+T5i.

Thus, the scheduler queue state gets equal to the real queue state at initial time t or at time t+T3i.

2. Correctness After Any Change of the Real Queue State After Initialisation

If, after initialisation, the real state of a queue changes, then the scheduler state gets equal to the real queue state after a bounded delay.

The real state of the queue can only change in the following cases:

a. When a message is enqueued and when the queue was initially empty. The scheduler receives the event 'SETNE' at the time t+T1i, and updates its state to 'Non_Empty' at time t+T1i+T2i.

b. When the local scheduler (i.e the scheduler associated to the working server process) dequeues the only message of the queue, the scheduler updates its state to 'Empty' at time t+T4i+T5i.

c. When a remote scheduler (i.e a scheduler associated to a process different from the one performing a scheduling operation) dequeues the only message if the queue is 'Non_Empty', the scheduler updates its state to 'Non_Empty' at time t+T1i+T2i. If a remote scheduler has performed a dequeue operation, the local scheduler is not aware that the queue is empty, but it performs a dequeue at time t+T3i and updates its state when it receives the dequeue status at time t+T3i+T4i+T5i.

Robustness

The schedulers of a process group are distributed in several processors, and are independent. As a consequence, no scheduler is aware of the existence of others. The number of schedulers, N, is by definition supposed to be greater than or equal to 2. Hence, if up to N−1 processors or schedulers, or connections between a processor and the packet memory fail, then there is no impact on the remaining schedulers.

If a performance failure occurs in one processor, the others are not affected because each scheduler can perform any dequeue operation at its own rhythm.

Performance

The performance of a scheduling mechanism is given by the number of signalling messages (S) and the number of dequeue operations (D) needed to process M messages with N schedulers.

The worst case is when the N schedulers perform a dequeue operation for each message, and when a signalling message is sent at each data message.

To process M messages, $Smax = M \times N$ and $Dmax = M \times N$.

The best case is when a queue never gets empty. There is only one signalling message sent to each scheduler at enqueuing of the first message, and no dequeue is unsuccessful.

To process M messages, $Smin = N < M \times N$ and $Dmin = M < M \times N$.

Thus, it is interesting to be noted that the best performance occurs when the queue does not get empty. Processing time is minimum when the number of messages in the queues is high, which corresponds to the capability of the scheduling mechanism to support high scheduling traffic.

We claim:

1. In a multiprocessor environment wherein a plurality of processors are attached through a bussing system to a shared intelligent memory, said plurality of processors being interconnected via queuing operations performed through said shared intelligent memory, a distributed scheduling mechanism provided for coordinating and arbitrating processes, each process including a set of programmed elementary tasks to be performed by server or target processors upon request from a source processor handling source processes with a set of target processors working on the same queue defining a process group, said processes communicating through said queue(s) by using messages, said scheduling mechanism including:

a) defining within said shared memory for each said queues a set of memory locations connected to operate as a FIFO data message queue dedicated to all server processors of a process group;

b) said shared intelligent memory memorizing for each process group, a signalling processor list SPL containing references of the server processors which need to dequeue data messages from said queue and attaching said list to the FIFO data message queue;

c) enabling a given source process to enqueue a data message into said FIFO data message queue;

d) monitoring, with said intelligent memory, the status of said FIFO data message queue and, if said queue was empty prior to enqueuing the data message, generating a signal E-NE signalling the transition of the queue content from empty to non-empty upon said enqueuing of a new data message;

e) providing a scheduler mechanism within each server processor of the process group;

f) providing a scheduler state table in each of the scheduler mechanism for listing at least one logical record address (LRA) of a FIFO data message queue and a state of the FIFO data message queue;

g) said shared intelligent memory, transmitting said E-NE signal to all said server processors of said signalling processor list;

h) upon receipt of said E-NE signal by the server processors, scheduling a given server processor through its dedicated scheduler mechanism to access the FIFO data message queue and dequeue from said data message queue a data message to be used by said server processor; and i) updating the FIFO data message queue state within the scheduler state table dedicated to each scheduler.

2. A distributed scheduling mechanism according to claim 1, wherein said steps of defining a FIFO data message queue and attaching the SPL list to the considered queue includes the steps of:

a) generating a logical record address (LRA) identifying said queue within said shared memory, said queue being controlled by a predefined multi-field queue control block (QCB) including a SPL field loaded with said SPL;

b) memorizing said logical record address (LRA) in a scheduler state table of each scheduler dedicated to a server process; and, c) initializing the state of said queue to a predefined value selected to identify an "empty" queue status.

3. A distributed scheduling mechanism according to claim 2, wherein the updating of said SPL includes:

a) generating within each scheduler pertaining to the considered process group, a multi-field ATTACH command signal including a processor map field (PMAP);

b) performing, in said shared intelligent memory, a logic OR function between the SPL field of the QCB and the PMAP field contents; and, c) updating said SPL field content accordingly.

4. A distributed scheduling mechanism according to claim 1 wherein said step of memorizing a signalling processor list (SPL) includes the steps of:

a) defining within said SPL field of the QCB, one bit location for each server processor among the plurality of server processors pertaining to the same process group; and, b) upon attachment of a given server processor to the FIFO data message queue, setting the corresponding SPL field bit location to an ON state.

5. In a multi-processor system having a shared intelligent memory for performing queuing operations which couple source processors, running source processes, to server processors, running server processes, with said queuing operations including a FIFO data message queue to which source processors queue data messages and server processors dequeue data messages, a device for performing decentralized scheduling of tasks comprising:

a scheduler state table means provided in said server processor for storing at least one logical record address (LRA) of a data message queue in the shared intelligent memory and a state (empty, E, or not empty, NE) of said data message queue; and a scheduling means operatively coupled to the scheduler state table; said scheduling means updating the scheduler state table dequeuing said data messages which are forwarded to a server processor for processing when a state change occurs in the data message queue and an E-NE signal generated by the shared memory indicating said data message queue contains messages to be dequeued is received.

* * * * *